No. 875,984. PATENTED JAN. 7, 1908.
F. J. COMMIN.
PORTABLE APPARATUS FOR LIQUEFYING AND PURIFYING SEWAGE.
APPLICATION FILED JAN. 25, 1906.

2 SHEETS—SHEET 1.

WITNESSES
S. M. McColl
Paul E. Johnson

INVENTOR
Fred James Commin
By D. C. Somes
Attorney

No. 875,984. PATENTED JAN. 7, 1908.
F. J. COMMIN.
PORTABLE APPARATUS FOR LIQUEFYING AND PURIFYING SEWAGE.
APPLICATION FILED JAN. 25, 1906.

2 SHEETS—SHEET 2.

WITNESSES
S. M. McColl,
Paul E. Johnson.

INVENTOR
Fred James Commin
By F. L. Somes
Attorney

UNITED STATES PATENT OFFICE.

FREDERICK JAMES COMMIN, OF EXETER, ENGLAND, ASSIGNOR TO CAMERON SEPTIC TANK COMPANY, A CORPORATION OF ILLINOIS.

PORTABLE APPARATUS FOR LIQUEFYING AND PURIFYING SEWAGE.

No. 875,984.      Specification of Letters Patent.      Patented Jan. 7, 1908.

Application filed January 25, 1906. Serial No. 297,890.

*To all whom it may concern:*

Be it known that I, FREDERICK JAMES COMMIN, a subject of the King of Great Britain, and a resident of Exeter, in the county of Devon, England, have invented certain new and useful Improvements in Purifying Apparatus for House Drainage, of which the following is a specification.

The object of the invention is to provide for isolated plants a simple, complete and efficient apparatus which will utilize or approximate, to a more or less practical degree, the septic system of purification. To this end the primary treating tank which ordinarily serves the purpose of a macerating tank, is provided with carefully devised nondisturbing inlets and nondisturbing outlets which enable it to perform to a more or less practical degree the functions of a septic tank in which anaerobic liquefaction takes place among the solids of the drainage. Further, the secondary tank which receives the liquid effluent from the primary tank is provided with means for increased aeration and aerobic bacterial action. Further, the tanks are preferably portable and so constructed as to be nestable for transportation and separable for installation.

Figure 1:
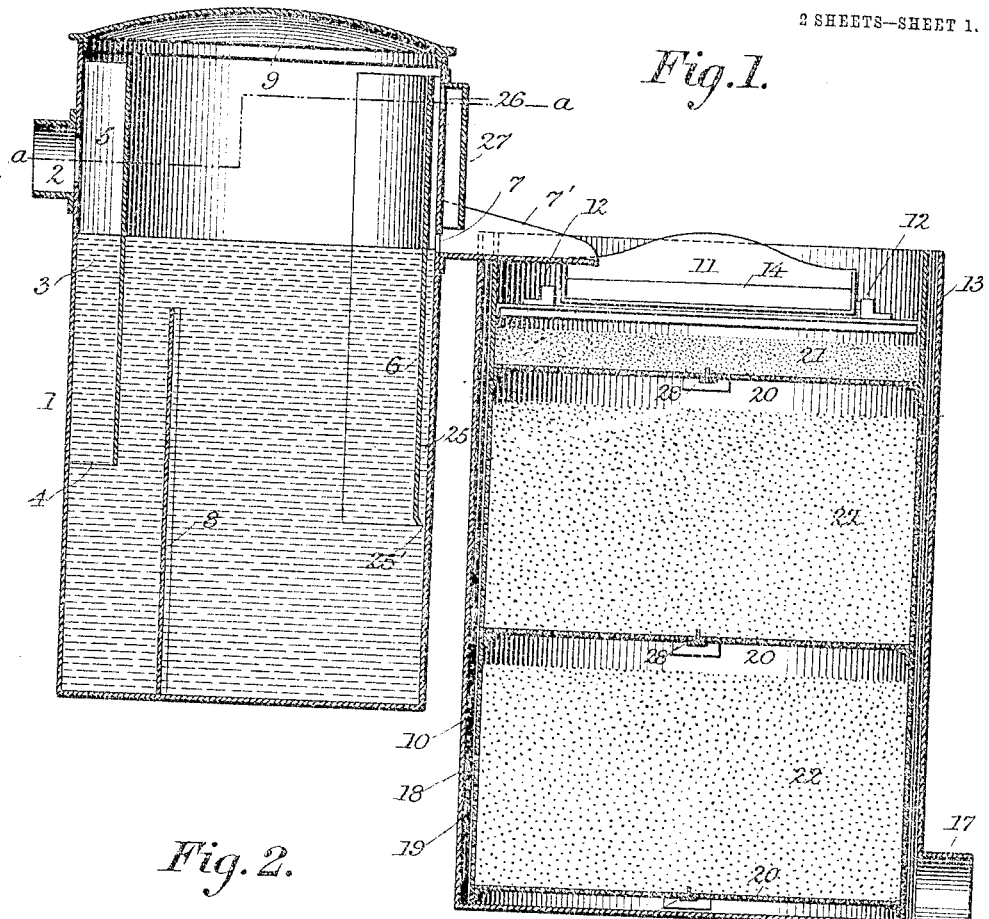
Figure 2:
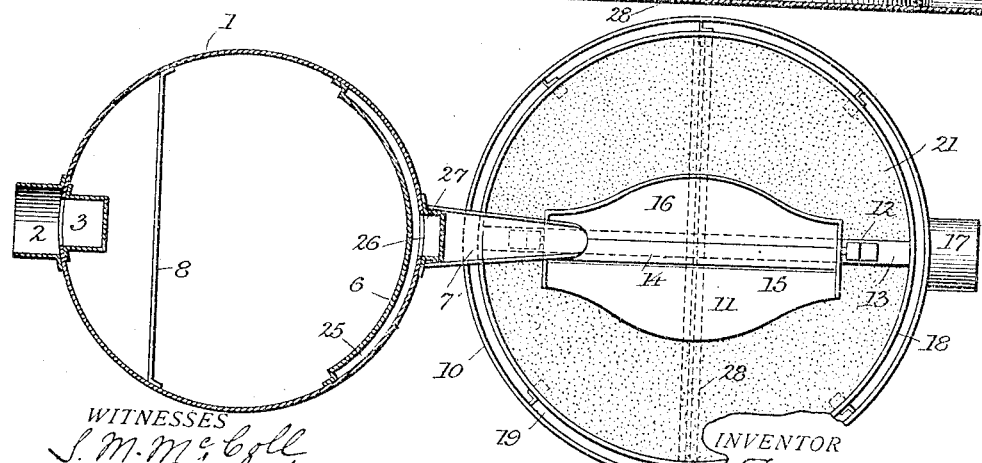
Figure 3:
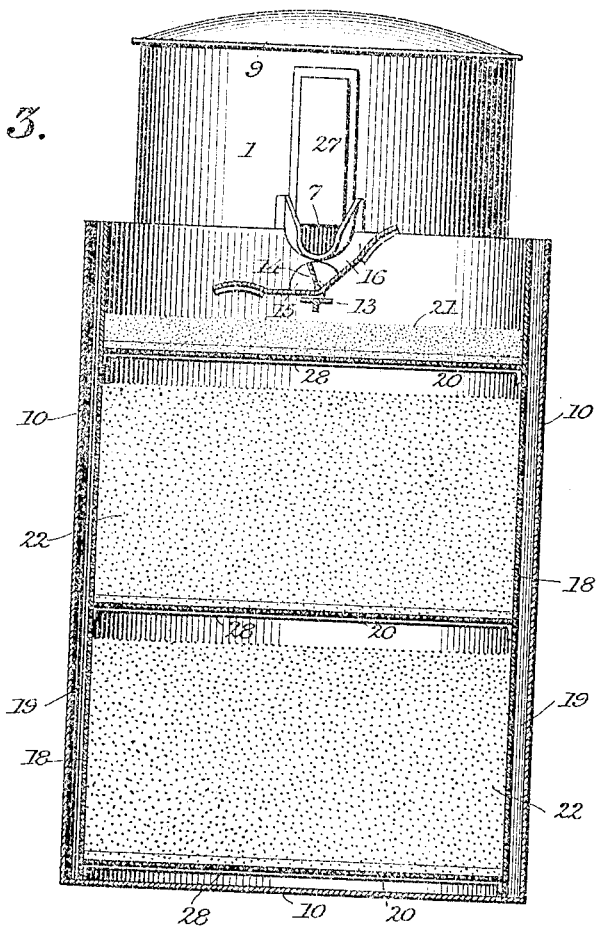
Figure 4:
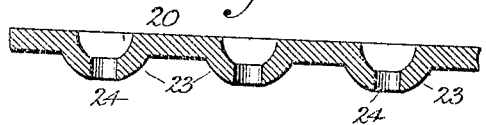

In the embodiment shown in the accompanying drawings Figure 1 represents a vertical section of a complete apparatus set up in position ready for use. Fig. 2 represents the primary tank in horizontal section on line 2—2 of Fig. 1 and the secondary filter tank in plan. Fig. 3 represents a vertical section through the filter tank taken at right angles to Fig. 1 and showing the upper part of the primary tank in elevation. Fig. 4 represents an enlarged sectional view of a fragment of one of the filter trays.

The same reference characters indicate corresponding parts in all the figures.

The apparatus shown comprises in its preferred form a primary treating tank 1 and an aerating filter tank 10, these tanks being preferably so constructed relatively as to be nestable for transportation and separable for use, being disposed adjacent to each other when installed.

The primary treating tank 1 is preferably constructed with a closed bottom and an open top, the latter being provided with a detachable cover 9. This tank is provided with a nondisturbing inlet and with a nondisturbing outlet, with the object of preventing as far as practicable interference, by the drainage flowing through the tank, with the accumulation and operation of a mass of anaerobic bacteria in the pool of sewage within the tank, and with a view of permitting the formation of a thick scum on the top of said pool and avoiding as far as practicable the breakage thereof. The inlet is rendered nondisturbing by having a submerged discharge orifice and the outlet is rendered nondisturbing by having a submerged mouth, preferably more or less expanded, and shields or guards are preferably used in front of the inlet and in front of the outlet for further reducing the tendency of the flowing current to agitate the pool.

The nondisturbing inlet shown comprises an inlet opening 2 in the wall of the tank near the top thereof adapted to be connected with a pipe or conduit through which the drainage to be treated is conveyed and a channel 3 communicating with said opening and extending above and below it. The lower end 4 which constitutes the discharge orifice of this channel is considerably below the normal water-line of the tank, thus affording a submerged inlet for the inflowing drainage. The channel 3 is preferably open at its upper end 5 above the normal water-line to facilitate cleaning.

The nondisturbing outlet of the primary treating tank is preferably disposed opposite the nondisturbing inlet thereof. In the example shown said outlet comprises a lateral outlet opening 7 on the normal water-line of the tank and a broad outlet channel 25 leading to said outlet opening from a point within the tank below said normal water-line. This channel may be formed between the wall of the tank and a shield 6 disposed therein. This shield preferably arc-shaped in horizontal section covers a large portion of the inner circumference of the tank and extends considerably above and considerably below the normal water-line thereof, and its lower edge is preferably bent towards the wall of the tank forming a long and narrow mouth 25′ for the channel 25. This outlet opening 7 may be provided with a lateral spout 7′ disposed on the outside of the tank adjacent to said opening for delivering the effluent from the primary treating tank to the filter tank 10 when they are disposed side by side. The channel 25 is provided near its top above the outlet opening 7 with a supplemental outlet opening 26 through the wall of the tank opposite the upper end of the plate 6. A hood 27 disposed outside the primary treating tank directs the outflow through said supplemental opening into the lateral spout 7'. In case of a sudden inrush of sewage filling the primary treating tank above the normal water-line thereof, the surplus will escape through this supplementary outlet 26. The primary treating tank is preferably provided with a shield partition plate 3 disposed between the discharge 4 of the inlet and the mouth 25' of the outlet so as to break the rush of the inflow and guard against disturbance of the liquid within the tank and breakage of the scum thereon. The cover 9 may be dispensed with if desired as the scum which is formed on the liquid will exclude light and air therefrom.

The aerating filter tank comprises an outer casing 10 and an inner perforated casing 18 smaller than the casing 10, said inner casing 18 being disposed in the outer casing 10 in such manner as to form a ventilating air passage 19 between them, which passage is open to the atmosphere at the top of the tank. This aerating filter tank is open at its top and provided near its bottom with an opening 17 through which the purified drainage flows out. The inner casing 18 of the aerating filter is provided with a series of preferably removable perforated plates or trays 20 disposed one below another, the lowermost tray constituting the bottom of said casing. These plates are preferably divided diametrically and supported at their adjacent edges on cross bars 28 which are also preferably removable. These trays or diaphragms support successive layers or beds of filtering material as 21 and 22 disposed one under another with air spaces between them, said air spaces communicating with the air passage 19. The top layer 21 is preferably of finer grain than the succeeding layers to prevent the too rapid passage of the liquid therethrough. The filtering material may be composed of slag, coke or other material adapted for the purpose. These trays or plates are preferably provided with bosses 23 on their undersides opposite the perforations, each boss having a perforation 24 through which the effluent trickles. These bosses prevent the drops from the different holes or perforations from adhering to the under surface of the tray and sliding along and joining one another, which would interfere with the uniform distribution of the liquid.

A distributer is mounted at the top of the aerating tank and is preferably composed of a pivoted diverter 11 provided with trunnions at its opposite ends which turn in bearings of lugs 12 supported on a cross bar 13 within the casing 18 near the top thereof. This diverter is divided longitudinally by a partition 14 so as to form two pockets 15 and 16 into which the effluent from the primary tank is alternately delivered from the point of the spout 7'. The diverter is thus rendered automatic in its action or in other words the flow or the stream of drainage to be distributed controls its motion, no extraneous means being required to operate it. When for instance the diverter is tilted so that the pocket 15 is up and the pocket 16 is down, the pocket 15 is then in position to receive the stream of drainage from the spout 7' or other means of delivery. As the pocket 15 is filled the weight of the liquid therein overbalances the opposite unfilled pocket 16 and causes the diverter to tilt whereby the pocket 15 is thrown down and discharges its contents onto the filter bed and the pocket 16 is thrown up into position to receive liquid from the spout, and when the pocket 16 is filled the weight of the liquid reverses the diverter and the operation is repeated; the diverter thus distributing the effluent first from one pocket and then from the other onto opposite sides of the upper layer 21 of filtering material, whence it drips through to the next layer beneath and so on. The diverter is rounded somewhat in contour to correspond approximately with the contour of the casing to facilitate a uniform distribution over the entire surface of the filtering material therein.

The tanks 1 and 10 are preferably constructed so that they may be nested together and the distributer 11, trays 20 and supports therefor, may be packed within the tank 10, so that the entire apparatus for an installation is self-contained and may be shipped in a single package.

When the apparatus is installed for use as in Figs. 1 and 2 the drainage flowing through the primary tank 1 is liquefied by the mass of anaerobic bacteria allowed to accumulate therein and the liquid effluent from said primary tank is further purified by exposure to light and air and aerobic bacteria in passing to the filter tank or to and through the distributer thereon and is also further purified by both the aerobic bacterial action and mechanical filtration in passing through the successive layers of filtering material contained in said filter tank. The air passage 19 open at its top to the atmosphere and the spaces between the filter beds communicating with said passage constitute means for the circulation of air through the several successive layers of filtering material, whereby aerobic bacterial action is stimulated.

I claim as my invention:—

1. A portable apparatus for the treatment of drainage comprising primary treating and filter tanks nestable for transportation and separable for installation; the primary treating tank having a nondisturbing inlet and a nondisturbing outlet, and the filter tank comprising an outer casing having a low outlet and a perforated inner casing disposed in said outer casing with a ventilating air passage between them, said inner casing having means for supporting filtering material.

2. A portable apparatus for the treatment of drainage comprising primary treating and filter tanks nestable for transportation and separable for installation; the primary treating tank having a nondisturbing inlet and a nondisturbing outlet, and the filter tank comprising inner and outer casings disposed one within the other and forming a ventilating air passage between them, said inner casing being provided with movable trays for supporting separate layers of filtering material one below another.

3. An apparatus for the treatment of drainage comprising a portable primary treating tank having a nondisturbing inlet and a nondisturbing outlet, and a filter tank comprising inner and outer casings disposed one within the other and forming a ventilating air passage between them; said inner casing being provided with movable trays for supporting separate layers of filtering material one below another, the walls of said inner casing having perforations connecting the spaces between the trays with said air passage between the casings.

4. A tank for the treatment of house drainage provided with a nondisturbing inlet comprising a lateral inlet opening and a channel extending below and above said opening and communicating therewith, said channel being open at its top and bottom.

5. A septic tank for the treatment of drainage provided with a nondisturbing outlet comprising an outlet channel extending above and below the normal water-line of the tank and having its receiving mouth below said normal water-line, an outlet opening communicating with said channel at said normal water-line, and a supplementary outlet opening communicating with said channel above said water-line.

6. A tank for the treatment of drainage or sewage provided with a nondisturbing outlet comprising an outlet channel extending above and below the normal water-line of the tank and having a widely expanded mouth below said normal water-line, and an outlet opening communicating with said channel at said normal water-line, and a supplementary outlet opening communicating with said channel above said water-line.

7. A filter tank for use in the treatment of drainage or sewage comprising inner and outer casings disposed one within the other and forming between them a ventilating air-passage open at the top and bottom of said tank, and perforated trays disposed within said inner casing for supporting separable layers of filtering material one below another, said inner casing having perforations connecting the spaces between the trays with the air passage between the casings.

8. A filter tank for use in the treatment of drainage or sewage comprising inner and outer casings disposed one within the other and forming between them a ventilating air passage open at the top of said tank and perforated trays disposed within said inner casing for supporting separate layers of filtering material one below another, a tray above being provided with drip projections for controlling the distribution to a tray below, said inner casing having perforations connecting the spaces between the trays with the air passage between the casings.

9. The combination of a tank for the treatment of drainage or sewage, and a filter tank comprising inner and outer casings disposed one within the other and forming a ventilating air passage between them; said inner casing being provided with movable perforated trays for supporting separate layers of filtering material one below another, the walls of said casing having perforations connecting the spaces between the trays with said air passage between the casings.

FREDK. JAMES COMMIN.

Witnesses:
EUSTACE H. BARKER,
JOHN J. NEWPORT.